United States Patent [19]

Herron

[11] 4,161,578

[45] Jul. 17, 1979

[54] PROCESS FOR SOLID PHASE POLYMERIZATION OF POLYESTER

[75] Inventor: Dale J. Herron, Minneapolis, Minn.

[73] Assignee: Bepex Corporation, Santa Rosa, Calif.

[21] Appl. No.: 905,226

[22] Filed: May 12, 1978

[51] Int. Cl.$^2$ .............................................. C08G 63/18
[52] U.S. Cl. ..................................... 528/272; 528/309
[58] Field of Search ................................ 528/272, 309

[56] References Cited

U.S. PATENT DOCUMENTS 4,064,112   12/1977   Rothe et al. ........................ 528/272

*Primary Examiner*—Lucille M. Phynes
*Attorney, Agent, or Firm*—Burd, Braddock & Bartz

[57] ABSTRACT

A process for the continuous production of high molecular weight polyethylene terephthalate wherein the granular polymer having an intrinsic viscosity of at least 0.4 is crystallized, dried and polymerized in the solid phase by polycondensation. Two methods of crystallization are described which aid the process in overcoming problems associated with sticking in the polymerization stage. The method is characterized by polycondensation at a temperature greater than the crystallization temperature.

8 Claims, 4 Drawing Figures

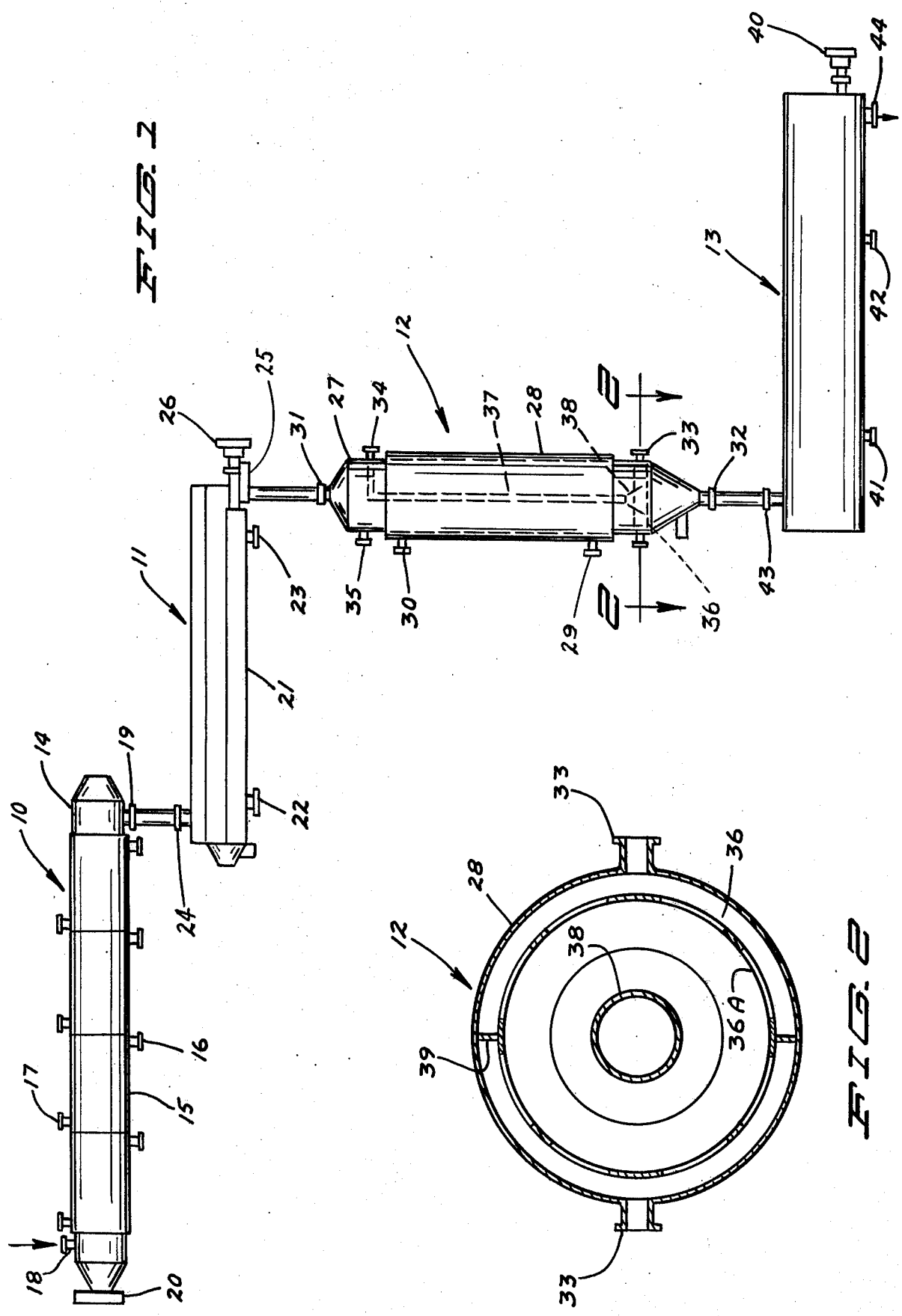

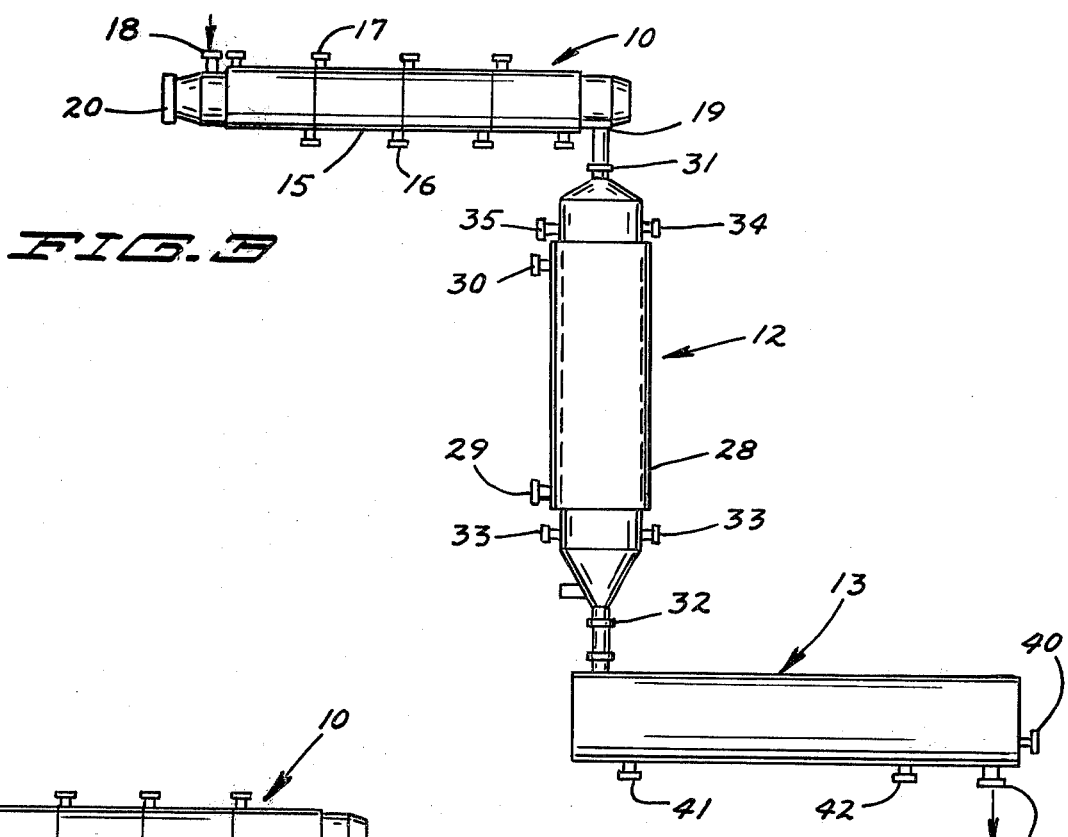
FIG. 3
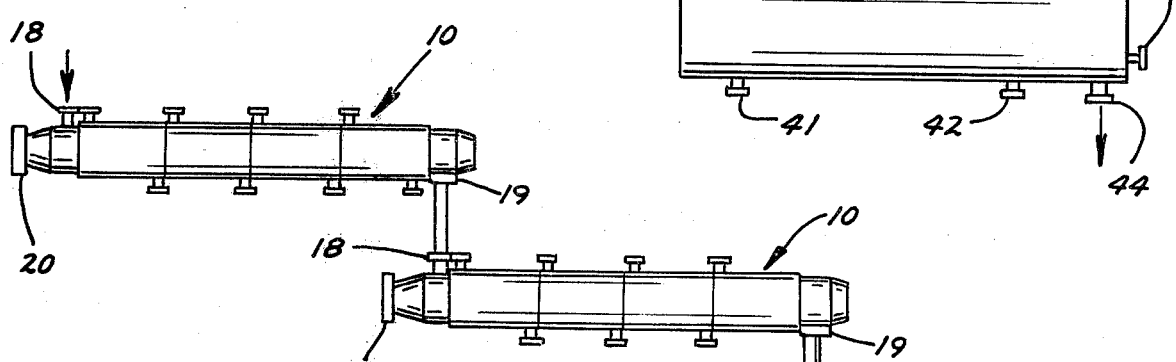
FIG. 4
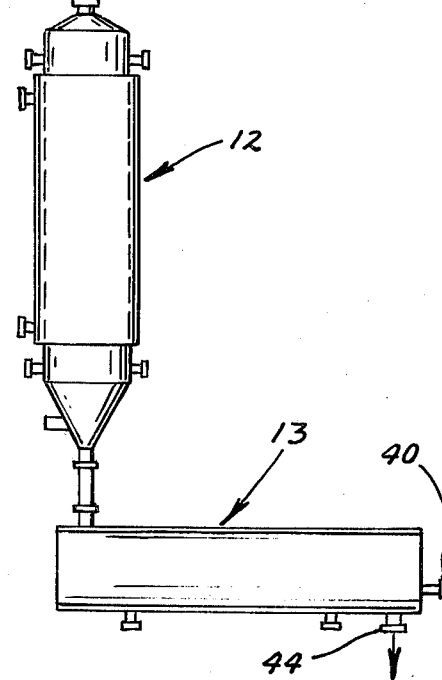

PROCESS FOR SOLID PHASE POLYMERIZATION OF POLYESTER

BACKGROUND OF THE INVENTION

1. Field of the Invention

This invention relates to a process for the continuous solid phase polymerization of polyester. More particularly, the invention relates to a process for the continuous production of high molecular weight polyethylene terephthalate by polycondensation in the solid phase wherein granulated polyethylene terephthalate is first crystallized and thereafter subjected to solid state polycondensation.

2. The Prior Art

High viscosity polyesters have been produced in the solid phase at temperatures below the melting point of the polyethylene terephthalate condensates and under an inert gas blanket or vacuum. However, this known method has the disadvantage that the granulate becomes sticky in the course of the solid state polycondensation. Rothe et al U.S. Pat. No. 4,064,112 discloses prior attempts to solve this sticking problem, including that for which the patent was issued. The use of rotary vacuum units or fluidized bed units overcame the sticking problem by constant agitation of the polymer during the polymerization process but were economically disadvantageous.

The Rothe et al patent is directed to a method of avoiding sticking without agitation in the reaction stage, but with definite limits on operating temperatures. The polymerization temperature must always be equal to or less than the crystallization temperature. That is, the Rothe invention is based on the "surprising discovery" that sticking of the granulate during the solid state polycondensation may be completely prevented if the solid state polycondensation is preceded by a crystallization utilizing temperatures which are higher than, or equal to, the temperature at which the solid state polycondensation is effected. Agitation of the granulate is required only within the crystallization zone. Crystallization according to Rothe et al is effected at a temperature of 220° C. to 260° C. and the solid state polycondensation is effected at the same or lower temperature within the same range.

SUMMARY OF THE INVENTION

The present invention is based upon the discovery that sticking of the granulate polymer during solid phase polymerization can be prevented, contrary to Rothe et al, by carrying out the polycondensation step at a temperature higher than the crystallization temperature.

Polymerization at temperatures higher than the crystallization temperature is desirable for several reasons. First, a small increase of about 5° C. in the polymerization temperature can give improved reaction rates on the order of about 1.2 to 1.5 times. This enables one to minimize equipment size, or maximize capacity on installed equipment. Second, since polymerization temperatures can be higher than crystallization temperatures, the process does not have an absolute dependence on the crystallizer capability and is, therefore, more versatile in respect to operating conditions. Finally, since a minimum amount of gas is required for the process, it is economical to heat this gas in excess of the crystallized polymer temperature in order to add additional heat to the polymer.

The invention then is directed to a process for continuous production of high molecular weight polyethylene terephthalate by polycondensation in the solid phase from a dried granulated polyethylene terephthalate having a beginning intrinsic viscosity of at least 0.4. The process comprises crystallizing the polymer at a temperature in the range of about 180° C. to 220° C. under forced motion in an inert gas atmosphere for a residence time of from 0.25 to less than 1.5 hours, dependent upon the conditions of crystallization. The polymer is crystallized to a density of at least 1.385 grams per cubic centimeter and a moisture content of less than 0.02 percent by weight, and the crystallized product is discharged at a temperature of at least 180° C. The crystallized granulate is continuously introduced under air-tight seal to a continuous fixed bed reactor and polycondensed in contact with a counter flow of an inert gas at a temperature in the range of about 210° C. to 235° C. and to achieve a reaction temperature within the range of about 200° C. to 230° C. which is higher than the crystallization temperature.

If the crystallization is carried out in a high agitation, high heat transfer type of apparatus, the crystallization may be completed in about 0.25 hour. If it is carried out in a combination of a high agitation unit and an apparatus with gentle agitation, the crystallization can be completed in 0.5 to less than 1.5 hours.

The granulate should move through the fixed bed reactor at a minimum superficial velocity of at least 0.25 feet per hour. The preferred inert gas is nitrogen. It flows through the fixed bed reactor countercurrent to the polymer in order to remove all reaction products from the solid state reactor. The weight ratio of nitrogen to granulate may be in the range of 0.25 to 3.5. Preferably the range is about 0.5 to 1.5.

Final intrinsic viscosity of the polymer is in the range 0.4 to 1.2. The final acetaldehyde content of the polymer is less than 1 part per million, making the product suitable for the manufacture of containers for foods and beverages for human consumption.

BRIEF DESCRIPTION OF THE DRAWINGS

The invention is further illustrated by the accompanying drawings in which corresponding parts are identified by the same numerals and in which:

FIG. 1 is exemplary of a system utilizing a combination of a high agitation unit along with an apparatus with gentle agitation for crystallization of the polymer;

FIG. 2 is a section on an enlarged scale taken on the line 2—2 of FIG. 1 and in the direction of the arrows;

FIG. 3 is exemplary of a similar system utilizing a single high agitation, high heat transfer type of crystallization unit; and FIG. 4 is exemplary of a system utilizing a pair of high agitation, high heat transfer crystallization units in series.

DETAILED DESCRIPTION OF THE PREFERRED EMBODIMENT

Referring now to the drawings, and particularly to FIGS. 1 and 2, there is shown in schematic diagram form one exemplary system for the continuous production of high molecular weight polyethylene terephthalate by crystallization followed by solid phase polycondensation. This system utilizes a combination of a high agitation, high heat transfer apparatus with a gentle agitation, low heat exchange apparatus for crystallization. The system includes in series a first forced motion heat transfer unit, indicated generally at 10, a further forced motion heat transfer unit 11, a fixed bed reactor 12, and a forced motion agitating cooler 13.

Heat transfer unit 10 is comprised of a mechanical agitator rotating in a cylindrical housing 14. Housing 14 is surrounded by one or more heat transfer jackets 15 for gaseous or liquid heat transfer media. Jackets 15 are provided with fluid inlets and outlets 16 and 17, respectively. The housing is provided with a product inlet nozzle 18 and a discharge 19. The agitator is motor driven through pulley 20 and equipped with a large number of narrow flat paddles which sweep close to the inner surface of the cylindrical housing. The paddles are preferably adjustable pitch so as to vary the residence time. A preferred high agitation, high heat transfer apparatus is that disclosed in Langsetmo et al U.S. Pat. No. 3,425,135, which is sold by the Strong-Scott Division of Bepex Corporation under the registered trademark SOLIDAIRE.

The low agitation heat exchanger 11 preferably has a hollow screw, adaptable to receive a heat transfer medium, and journaled for rotation about a horizontal axis in a closed jacketed trough 21. An inlet 22 and outlet 23 are provided to circulate a heat transfer medium through the jacketed trough and conveying screw. The trough is provided with a material inlet 24 connected to receive the discharge in air-tight seal from the initial heat transfer unit 10, and a granulate discharge 25. The screw is motor driven through pulley 26. A preferred form of low agitation heat exchanger is that sold by the Rietz Division of Bepex Corporation under the trademark THERMASCREW.

The fixed bed reactor 12 is a cylindrical column 27 with at least a 4:1 length to diameter ratio so that the bulk velocity of the granulate through the reactor in a downward direction is a minimum of 0.25 foot per hour. The column 27 is provided with a jacket 28 having an inlet 29 and outlet 30 for circulation of a heat transfer medium. The column is fitted with a product inlet 31 and a product discharge 32. Reactor column 26 is provided with hot inert gas inlets 33 and 34 and gas discharge 35.

In the preferred form of reactor, the hot gas enters inlets 33 adjacent the bottom end of the reactor and is distributed evenly through a manifold 36 around the outer periphery of the reactor housing through a plurality of screened apertures 36A into the bottom end of the fixed bed. Preferably further hot gas is introduced into gas inlet 34 adjacent the top end of the reactor and downwardly through the bed through a centrally disposed pipe 37 to the top of a distributor cone 38 in the bottom end of the reactor, where the gas is distributed by the cone surfaces into the interior of the bed. Manifold 36 is desirably divided by walls 39. In this preferred form of reactor, uniform distribution of the gas and resultant uniform heating of the polymer is assured. Preferably the gas discharge is passed to a scrubber or absorber unit where reaction products are removed. The gas is then recycled.

The polycondensed product from reactor discharge 32 preferably is passed through a forced motion low agitation cooler 13 which may be a jacketed cylindrical housing or trough fitted with low agitation paddles or a hollow screw motor driven through drive pulley 40. The cooler jacket and conveying screw are provided with inlet 41 and outlet 42 for circulation of a cooling heat exchange medium. The cooler housing is provided with a product inlet 43 and cooled product discharge 44. A preferred form of cooler is a THERMASCREW heat exchanger.

In the typical practice of the process utilizing the system of FIG. 1, the polymer granules may be introduced to hopper 18 at about 10° C. to 20° C. (50°–68° F.). The granules are discharged from unit 10 and directly into heat transfer unit 11 at a temperature between about 150°–175° C. (300°–350° F.). The temperature of the granulate is raised to about 180° to 220° C. (355°–430° F.) and the crystallized granulate is discharged to the reactor at a temperature of at least 210° C. (410° F.). The heat transfer units 10 and 11 are operated so that the total residence time is less than 1.5 hours. Typically the residence time in unit 10 may be about 10 minutes and that in unit 11 about 0.5 to 1 hour. The product passes through the reactor in about 8 to 10 hours during which the temperature is raised to about 200° to 230° C. (390°–445° F.). The polycondensed product is cooled in the course of its passage through cooler 13 to about 65° C. (150° F.).

The system of FIG. 3 uses a single high agitation, high heat exchange transfer unit 10 to crystallize the polymer. In a typical example, the polymer is introduced to the unit at a temperature of about 10° C. (50° F.), crystallized therein and discharged to the hopper reactor 12 at about 215° C. (415° F.). The polycondensed product is discharged from the reactor at about 227° C. (440° F.) and cooled, as previously described. Because of the use of the single high agitation heat transfer unit, the residence time for crystallization can be reduced to about 0.5 hour or less.

The system of FIG. 4 is similar except that two high agitation, high heat transfer units 10 are employed in series. In a typical operation of the system, the polymer is again fed to the first heat transfer unit at a temperature of about 10° C. (50° F.). The temperature of the product is raised to about 177° C. (350° F.) in the first unit and to about 215° C. (420° F.) in the second unit. The total residence time for crystallization in both units is about 0.5 hour. The polycondensation and cooling is carried out as previously described.

EXAMPLES

The invention is further illustrated by the following examples. The examples were carried out using a single stage high agitation, high heat transfer crystallizer unit. After a minimum granulate velocity of at least 0.25 foot per minute through the reactor had been established, tests were made under varying operating conditions as set forth in the Table. In the Table, $T_c$ is the granulate temperature out of the crystallizer; $t_c$ is the total granulate residence time in the crystallizer unit (s); $T_R$ is the granulate temperature out of the reactor; $t_R$ is the residence time in the reactor; $V_R$ is the granulate velocity through the reactor; Kg $N_2$/Kg PET is the ratio of parts by weight of gas to parts by weight of granulate; and IV is the increase in intrinsic viscosity.

All of the runs were successful. No sticking occurred. The runs of the examples were conducted over a wide range of pellet sizes and over a wide range of beginning intrinsic viscosities (about 0.4 to 0.65). Polyesters were used from a number of producers including polymer derived both from terephthalic acid processes and from dimethyl terephthalate processes. All of the polyethylene terephthalate had a final acetaldehyde content of less than 1 part per million and a final moisture content of 0.001 percent or less.

It is apparent that many modifications and variations of this invention as hereinbefore set forth may be made without departing from the spirit and scope thereof. The specific embodiments described are given by way of example only and the invention is limited only by the terms of the appended claims.

TABLE I

| Example Number | $t_c$ (°C.) | $t_c$ (Hours) | $T_R$ (°C.) | $t_R$ (Hours) | $V_R$ (Feet/hour) | $\frac{\text{Kg N}_2}{\text{Kg PET}}$ | IV Increase |
|---|---|---|---|---|---|---|---|
| 1 | 177 | 0.8 | 204 | 9.8 | 0.6 | 2.3 | 0.09 |
| 2 | 178 | 0.7 | 205 | 7.1 | 0.8 | 1.9 | 0.10 |
| 3 | 182 | 0.7 | 208 | 6.8 | 0.8 | 1.9 | 0.13 |
| 4 | 210 | 1.0 | 221 | 11.8 | 0.7 | 3.5 | 0.13 |
| 5 | 204 | 0.6 | 213 | 8.7 | 0.9 | 2.7 | 0.10 |
| 6 | 199 | 0.4 | 212 | 12.9 | 0.6 | 1.3 | 0.10 |
| 7 | 215 | 0.3 | 219 | 10.7 | 0.7 | 2.0 | 0.13 |
| 8 | 217 | 0.2 | 222 | 15.3 | 0.5 | 2.6 | 0.19 |
| 9 | 204 | 0.3 | 220 | 8.2 | 0.8 | 1.9 | 0.28 |
| 10 | 211 | 0.3 | 216 | 6.6 | 1.0 | 1.4 | 0.19 |
| 11 | 208 | 0.25 | 212 | 6.7 | 1.0 | 0.7 | 0.17 |
| 12 | 218 | 1.0 | 223 | 25.8 | 0.3 | 2.8 | 0.40 |
| 13 | 220 | 0.31 | 224 | 9.2 | 0.8 | 1.9 | 0.17 |
| 14 | 214 | 0.24 | 226 | 7.1 | 1.1 | 1.5 | 0.12 |
| 15 | 201 | 0.38 | 214 | 11.1 | 0.6 | 1.1 | 0.21 |
| 16 | 214 | 0.42 | 222 | 12.0 | 0.6 | 1.2 | 0.3 |

The embodiments of the invention in which an exclusive property or privilege is claimed are defined as follows:

1. A process for continuous production of high molecular weight polyethylene terephthalate by polycondensation in the solid phase from a dried granulated polyethylene terephthalate having a beginning intrinsic viscosity of at least 0.4 without occurrence of stickiness of the granulate, which process comprises:
   (A) crystallizing the polymer by heating at a temperature in the range of about 180° to 220° C. under forced motion and under an inert gas atmosphere for a residence time less than about 1.5 hours;
   (B) discharging the crystallized product at a temperature of at least 180° C., a density of at least 1.385 grams per cubic centimeter, and a moisture content of less than 0.02 percent by weight;
   (C) continuously introducing the crystallized granulate to a continuous fixed bed reactor and polycondensing in contact with an inert gas at a temperature in the range of about 210° to 235° C. to achieve a reaction temperature within the range of about 200° to 230° C. and higher than the crystallization temperature, whereby polycondensation takes place and sticking of the granulate is avoided; and
   (D) continuously removing the polycondensed granulate flowing from the reaction zone.

2. A process according to claim 1 wherein the granulate moves through the fixed bed reactor at a minimum superficial velocity of at least 0.25 foot per hour.

3. A process according to claim 1 wherein said inert gas flows through said fixed bed reactor countercurrent to said granulate at a weight ratio of gas to granulate in the range between about 0.25 and 3.5 parts gas per part by weight of granulate.

4. A process according to claim 3 wherein the inert gas is nitrogen.

5. A process according to claim 1 wherein the crystallized product is discharged at a temperature of at least 210° C.

6. A process according to claim 1 wherein the polymer is crystallized by heating under high agitation and high heat transfer conditions in a total residence time of less than about 0.5 hour.

7. A process according to claim 1 wherein the polymer is crystallized by heating under initial high agitation and high heat transfer conditions for about 10 minutes residence time followed by heating under low agitation and low heat transfer conditions for an additional 0.5 to 1.0 hour.

8. A process according to claim 1 wherein the polymer has a final intrinsic viscosity between 0.4 and 1.2.

* * * * *

UNITED STATES PATENT AND TRADEMARK OFFICE
CERTIFICATE OF CORRECTION

PATENT NO. : 4,161,578
DATED : July 17, 1979
INVENTOR(S) : Dale J. Herron

It is certified that error appears in the above-identified patent and that said Letters Patent are hereby corrected as shown below:

Column 5, Table I, in the heading for the second column, "$t_c$" should be --$T_c$--.

Signed and Sealed this

[SEAL]

Ninth Day of October 1979

Attest:

RUTH C. MASON
*Attesting Officer*

LUTRELLE F. PARKER
*Acting Commissioner of Patents and Trademarks*